(12) United States Patent
Chillar et al.

(10) Patent No.: US 8,261,528 B2
(45) Date of Patent: Sep. 11, 2012

(54) SYSTEM FOR HEATING AN AIRSTREAM BY RECIRCULATING WASTE HEAT OF A TURBOMACHINE

(75) Inventors: Rahul Jaikaran Chillar, Marietta, GA (US); Siddharth Girishkumar Upadhyay, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/771,480

(22) Filed: Apr. 30, 2010

(65) Prior Publication Data

US 2011/0247313 A1    Oct. 13, 2011

Related U.S. Application Data

(63) Continuation of application No. 12/757,442, filed on Apr. 9, 2010, now abandoned.

(51) Int. Cl.
*F02C 7/047* (2006.01)
*F02C 7/08* (2006.01)

(52) U.S. Cl. ............... 60/39.093; 60/39.511; 60/39.52; 60/782; 244/134 R; 415/116; 415/177

(58) Field of Classification Search ............... 60/266, 60/39.093, 39.511, 782; 244/134 R; 415/116, 415/177

See application file for complete search history.

(56) References Cited

U.S. PATENT DOCUMENTS

| | | | | |
|---|---|---|---|---|
| 2,435,990 | A | * | 2/1948 | Weiler ........................... 60/267 |
| 3,150,487 | A | * | 9/1964 | Mangan et al. ............ 60/39.182 |
| 3,703,807 | A | * | 11/1972 | Rice ............................ 60/39.182 |
| 4,328,666 | A | | 5/1982 | Cummins, Jr. |
| 5,560,195 | A | * | 10/1996 | Anderson et al. ............... 60/785 |
| 6,027,304 | A | * | 2/2000 | Arar et al. ..................... 415/116 |
| 6,250,064 | B1 | * | 6/2001 | Tomlinson et al. ............. 60/775 |
| 6,250,068 | B1 | * | 6/2001 | Tajima et al. ................... 60/803 |
| 7,246,480 | B2 | | 7/2007 | Ritland |

* cited by examiner

*Primary Examiner* — Ehud Gartenberg
*Assistant Examiner* — Steven Sutherland
(74) *Attorney, Agent, or Firm* — Cantor Colburn LLP

(57) ABSTRACT

An embodiment of the present invention takes the form of an application and process that incorporates a waste heat source to increase the temperature of the airstream entering an inlet section of a combustion turbine. An embodiment of the present invention may perform an anti-icing operation that reduces the need to operate the IBH system.

8 Claims, 4 Drawing Sheets

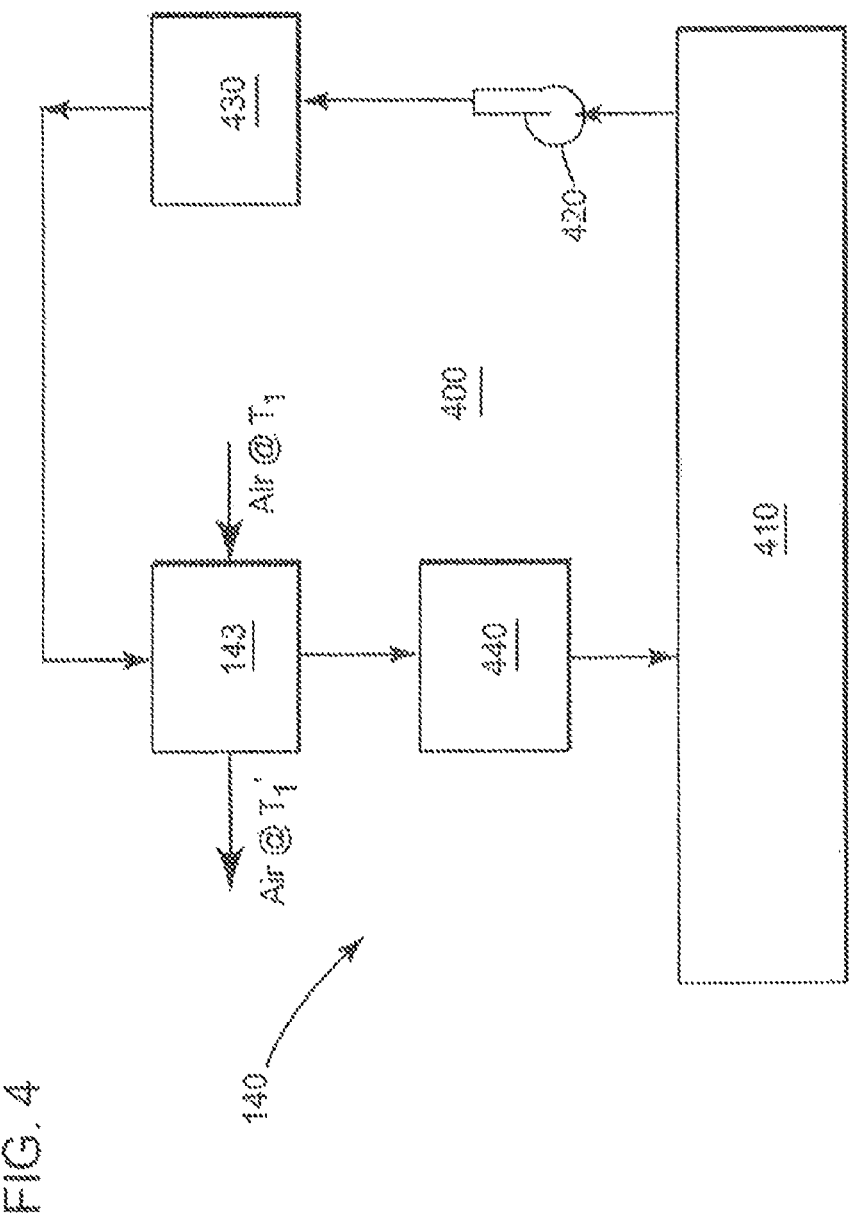

US 8,261,528 B2

SYSTEM FOR HEATING AN AIRSTREAM BY RECIRCULATING WASTE HEAT OF A TURBOMACHINE

This application is a continuation of application Ser. No. 12/757,442, filed on Apr. 9, 2010, now abandoned.

BACKGROUND OF THE INVENTION

The present invention relates to an anti-icing system of a combustion turbine; and more particularly to an anti-icing system that uses a waste heat source from the combustion turbine.

Some combustion turbines operate in cold and humid environments. These environments allow ice to form (hereinafter "icing") within the inlet system and on components down stream of the inlet system; which may be harmful to the combustion turbine. Icing can also increase the pressure drop across inlet system; negatively affecting the performance of the combustion turbine.

Anti-icing systems are used to prevent or remove icing. These systems may be a function of an inlet bleed heat system (IBH), which re-circulates hot compressor discharge air to the inlet system, raising the temperature of the inlet airstream. Furthermore, anti-icing systems typically modulate the IGVs to reduce the amount of air entering the compressor section. During anti-icing operation the power and efficiency of the combustion turbine are significantly reduced.

During the operation of the combustion turbine, a tremendous amount of heat, which is not converted to useful work, is generated. This waste heat can negatively impact various components. These components include, but are not limited to: bearings, casings, compartments, and the like. Auxiliary systems are used to remove the waste heat from the components.

For the foregoing reasons, there is a need for an anti-icing system that does not significantly impact the output and efficiency of the combustion turbine. The system should use the waste heat generated by the combustion turbine to increase the temperature of the airstream. The system should reduce the use of the IBH system.

BRIEF DESCRIPTION OF THE INVENTION

In an accordance with embodiment of the present invention, a system for heating an airstream consumed by a powerplant machine, the system comprising: an inlet system configured for receiving an airstream, the inlet system comprising: an air preheating system configured for heating the airstream; wherein the airstream enters the air preheating system at a first temperature and exits the air preheating system at a second temperature; a powerplant machine configured for generating power, wherein the powerplant machine ingests the airstream at the second temperature, wherein the powerplant machine is positioned downstream of the inlet system; and a waste heat source deriving from the powerplant machine, wherein the waste heat source transfers waste heat discharged by the powerplant machine to the air preheating system; wherein the waste heat increases the temperature of airstream flowing through the air preheating system.

In accordance with an alternate embodiment of the present invention, a system for heating an airstream consumed by a powerplant machine, the system comprising: an inlet system configured for receiving an airstream, the inlet system comprising: an air preheating system configured for heating the airstream; wherein the airstream enters the air preheating system at a first temperature and exits the air preheating system at a second temperature; a combustion turbine that comprises a compressor section which ingests the airstream at the second temperature; wherein the powerplant machine is positioned downstream of the inlet system; a waste heat source deriving from the powerplant machine, wherein the waste heat source transfers waste heat discharged by the powerplant machine to the air preheating system; and a turbine control system configured determining when to use the waste heat source to increase the temperature of the airstream; wherein the waste heat increases the temperature of airstream flowing through the air preheating system.

BRIEF DESCRIPTION OF THE DRAWINGS

FIG. 4 is a schematic illustrating the waste heat source of FIG. 1, in accordance with a second embodiment of the present invention.

DETAILED DESCRIPTION OF THE INVENTION

Figure 1:
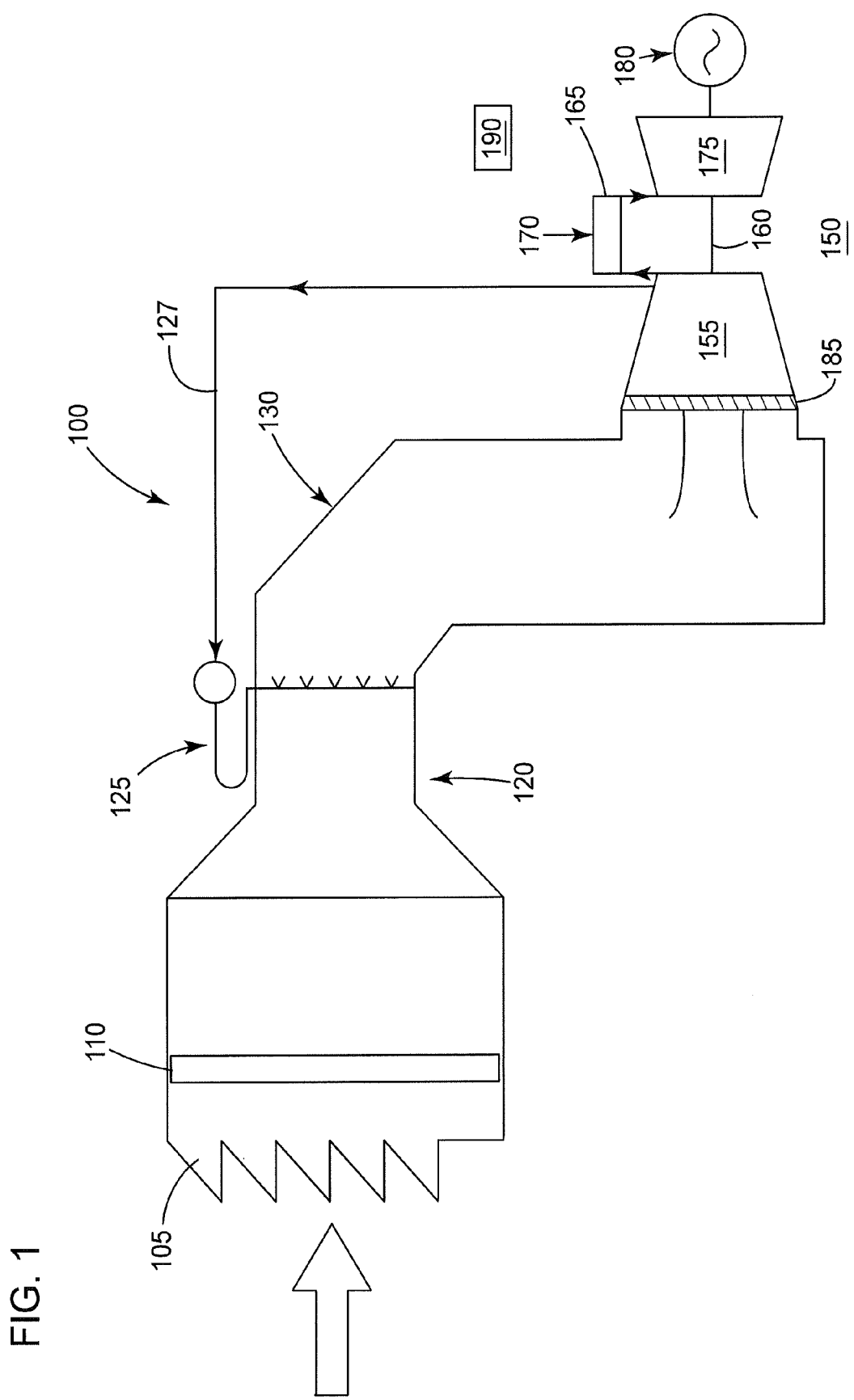
FIG. 1 is a schematic illustrating a conventional system for increasing the temperature of an airstream entering a combustion turbine.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

Detailed example embodiments are disclosed herein. However, specific structural and functional details disclosed herein are merely representative for purposes of describing example embodiments. Example embodiments may, however, be embodied in many alternate forms, and should not be construed as limited to only the embodiments set forth herein.

Accordingly, while example embodiments are capable of various modifications and alternative forms, embodiments thereof are illustrated by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

The terminology used herein is for describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Embodiments of the present invention may apply to a wide variety of combustion turbines that ingest an airstream. This may include, but is not limited to, aero-derivative turbines, gas turbines, or the like. These combustion turbines primarily function to increase pressure of the ingested airstream. These combustion turbines may consume a wide variety of energy sources, such as, but not limiting of, gas, liquid fuel, air, water, vapor, wind, electricity, thermal, steam, or any combination thereof.

It should also be noted that in some alternative implementations, the functions/acts noted might occur out of the order noted in the FIGS. Two successive FIGS., for example, may be executed substantially concurrently or may sometimes be executed in the reverse order, depending upon the functionality/operations involved.

An embodiment of the present invention takes the form of an application and process that incorporates a waste heat source to increase the temperature of the airstream entering an inlet section of a combustion turbine. An embodiment of the present invention may perform an anti-icing operation that reduces the need to operate the IBH system.

Referring now to the Figures, where the various numbers represent like elements throughout the several views. FIG. 1 is a schematic illustrating a conventional system for increasing the temperature of an airstream entering a combustion turbine 150. FIG. 1 illustrates a site comprising an inlet system 100; integrated with a combustion turbine 150; and a turbine control system 190.

The inlet system 100 channels the airstream (represented by the arrow pointed towards the inlet system 100) ingested by the compressor section 155. The airstream derives directly, or indirectly, from the environment where the combustion turbine 150 operates. Initially, the airstream flows around a weather hood 105, which may prevent weather elements, such as rain, snow, etc, from entering the compressor section 155. The airstream may then flow through an inlet filter house 110; which generally removes foreign objects and debris from the airstream. Next, the airstream may pass through a transition piece 120 and an inlet duct 130; these components may adjust the velocity and pressure of the airstream, prior to entering the compressor section 155. The airstream may also flow through an IBH system 125. When operating, the IBH system 125 increases the temperature of the airstream by recirculating a portion of the compressor discharge air, via an extraction supply 127, or the like. The recirculated air then flows through an IBH heat exchanger, or the like.

The inlet system 100 is generally integrated with the combustion turbine 150; which comprises a compressor section 155, which may include an IGV system 185, a combustion system 165, and a turbine section 175. The airstream generally exits the inlet system 100 and enters the compressor section 155, is compressed and then discharged to a combustion system 165, where a fuel 170, such as natural gas, is burned to provide high-energy combustion gases which drives from the turbine section 175. In the turbine section 175, the energy of the hot gases is converted into work, some of which is used to drive the compressor section 155 through the shaft 160, with the remainder available for useful work to drive a load such as the generator 180.

A turbine control system 190 generally controls the operation of the combustion turbine 150. The turbine control system 190 may receive operating data on the ambient conditions of the airstream. The operating data may be used to schedule the operation of the IBH system 125.

For example, but not limiting of, the turbine control system 190 may start the IBH system 125 if the ambient temperature is below approximately 40 Degrees Fahrenheit and if the airstream temperature is within approximately 10 Degrees Fahrenheit of the airstream dew point temperature. Here, the turbine control system 190 may employ a closed loop control scheme to maintain the airstream temperature approximately 10 Degrees Fahrenheit above the dew point to prevent condensation, which could form ice on surfaces below approximately 32 Degrees Fahrenheit.

Figure 2:
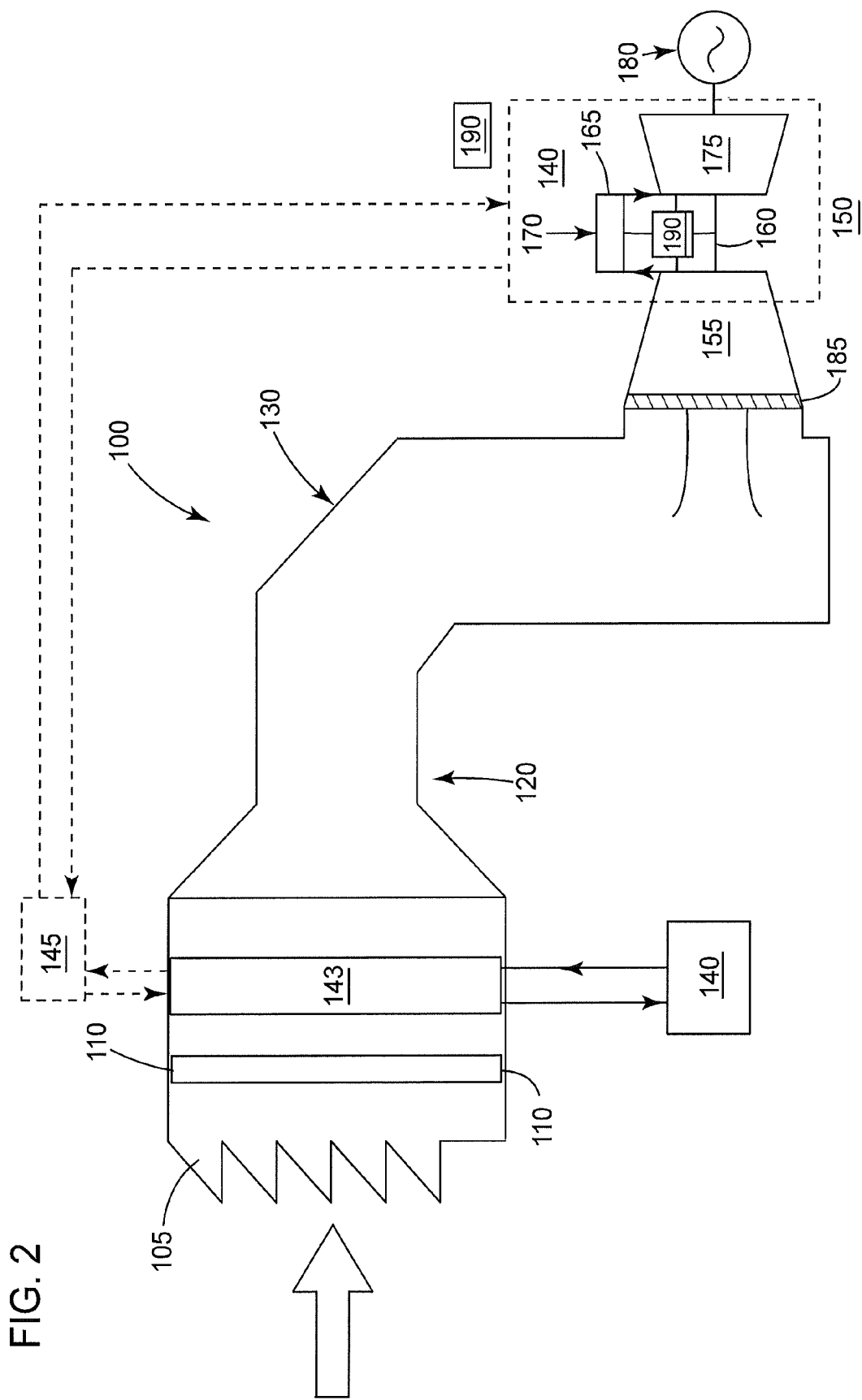
FIG. 2 is a schematic illustrating a system for increasing the temperature of an airstream entering a combustion turbine, in accordance with embodiments of the present invention.

FIG. 2 is a schematic illustrating a system for increasing the temperature of an airstream entering a combustion turbine 150, in accordance with embodiments of the present invention. FIG. 2 illustrates the inlet system 100, of FIG. 1, integrated with a waste heat source 140 and an air preheating system 143, in accordance with a first embodiment of the present invention. The operational goal of the waste heat source 140 is to increase the temperature of the airstream flowing within the inlet system 100, when ambient conditions allow for icing to occur. This may reduce the need to operate the IBH system 125, possibly increasing the efficiency and the output of the combustion turbine 150.

The waste heat derives from the combustion turbine 150, and is recovered with the aim of increasing the airstream temperature, when needed. The waste heat source 140 removes heat from the associated components of the combustion turbine 150. Embodiments of the present invention may use multiple approaches to increase the airstream temperature.

One approach may be considered a direct heating approach. Here, the air conditioning system 143 may comprise the form of a heat exchanger comprising a plurality of tubes. The airstream may flow over the tubes as the heated fluid of the waste heat source 140 flows through the tubes. This process may transfer a portion of the heat of the heated fluid to the airstream.

Another approach may be considered the indirect heating approach, which incorporates an external heat exchanger 145. Here, the flow path of the external heat exchanger 145 may be located between the air conditioning system 143 and the waste heat source 140. The external heat exchanger 145 may circulate water, which is heated by the heated fluid of the waste heat source 140. The heated water may then circulate through the air conditioning system 143, where the temperature of the airstream may increase. The indirect heating approach may serve to avoid the mixing of the heated fluid and the airstream, if a leak were to occur.

As described below, in connection with FIGS. 3 and 4, the waste heat source 140 may derive from various systems of the combustion turbine 150, which generate waste heat. Non-limiting embodiments of the waste heat source 140 of the present invention include the turbine compartment 300 and the lube oil system 400. These are described herein in reference to FIGS. 3 and 4 respectively. The present invention is not intended to be limited to only two waste heat sources. The present invention is intended to cover other waste heat sources 140 originating from the combustion turbine 150 not discussed herein.

Figure 3:
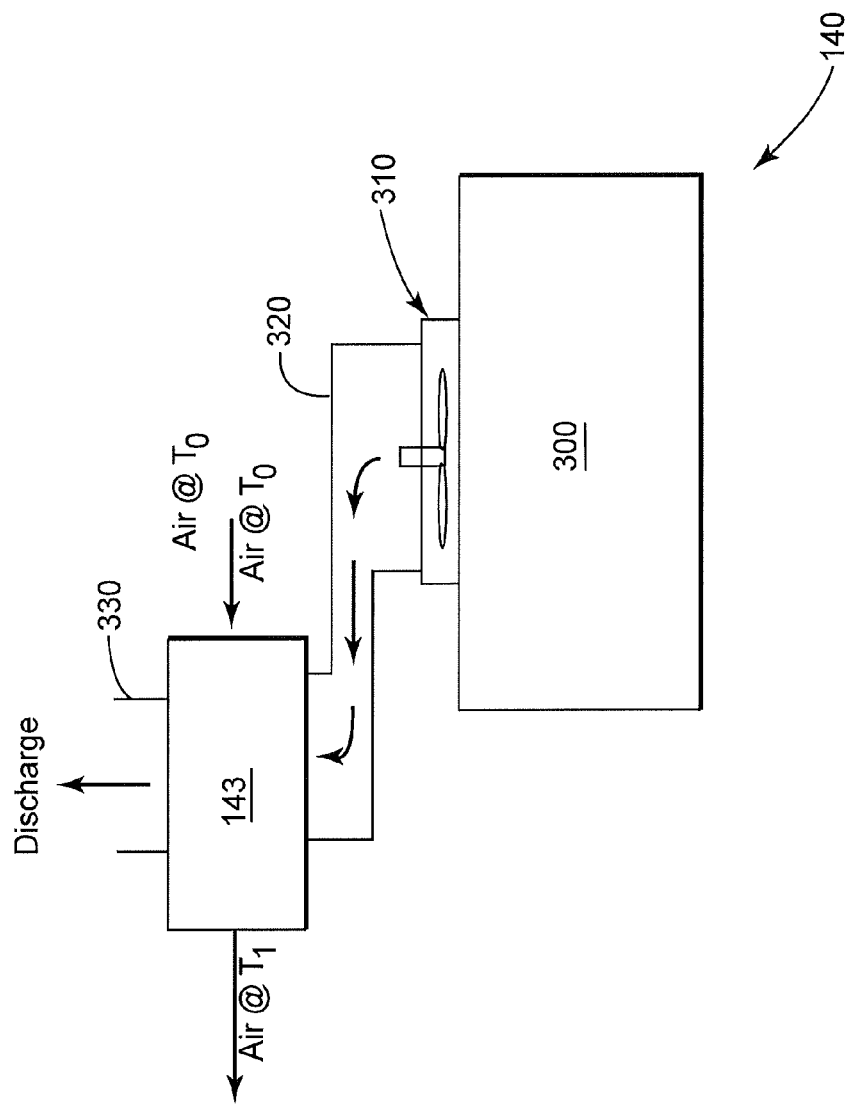
FIG. 3 is a schematic illustrating the waste heat source of FIG. 1, in accordance with a first embodiment of the present invention.

Referring now to FIG. 3, which is a schematic illustrating the waste heat source 140 of FIG. 1, in accordance with a first embodiment of the present invention. FIG. 3 illustrates a turbine compartment 300, which may serve as an enclosure for, inter alia, the combustion system 165, and the turbine section 175. During operation of the combustion turbine 150 the combustion system 165 and the turbine section 175 release heat into the turbine compartment 300. An exhaust fan 310 draws the heated air out of the turbine compartment 300. On some combustion turbines 150, the temperature of the heated air may be in the range of 300-400 Degrees Fahrenheit.

In an embodiment of the present invention, a duct system 320 may direct this heated air out of the turbine compartment 300 and into the air preheating system 143. After flowing through the air preheating system 143, the heated air may exit to the atmosphere via a vent system 330. This may occur while the airstream flows through the air preheating system 143, entering at a lower temperature T1, and exiting at a higher temperature T1'.

A non-limiting example of the benefit of the using the turbine compartment 300 as the waste heat source 140 is shown in Table 1. An application of an energy balance to the data of Table 1 then follows.

TABLE 1

| Properties | Airstream | Turbine Compartment Air |
|---|---|---|
| Mass Flow | M1 = 40171 Kg/min | M2 = 1460 Kg/min |
| Temperature - Inlet | T1 = 32 Deg. F., 273 Deg. K | T2 = 400 Deg. F., 477 Deg. K |
| Temperature - Outlet | T1' = | T2' = 62 Deg. F., 290 Deg. K |
| Cp | 1.005 | 1.005 |

Energy Balance $$(M1-M2)*Cp*(T1'-T1)=M2*Cp*(T2-T2')$$

$$(40171-1460)*(T1'-273)=1460*(477-290)$$

$$T1'(\text{Airstream})=280 \text{ Deg. K}=44.3 \text{ Deg. F.}=6.85 \text{ Deg. C.}$$

Here, the 44.3 Deg. F. of T1' indicates that the airstream temperature flowing downstream of the air conditioning system 143 may be above an icing temperature.

Referring now to FIG. 4, which is a schematic illustrating a waste heat source 140 of FIG. 1, in accordance with a second embodiment of the present invention. FIG. 4 illustrates a lube oil system 400, which serves to lubricate, inter alia, a bearing 430 of the combustion turbine 150. A pump 420 serves to circulate the lube oil throughout the lube oil system 400. The lube oil flows from the tank through the pump 420 and then to the bearing 430. The lube oil removes heat from the bearing 430 and associated structure, thereby increasing the temperature of the lube oil (herein after "hearted oil"). The heated oil may then flow directly, or indirectly via the external heat exchanger 145, to the air preheating system 143. Here, the heated oil may increase the temperature of the airstream, as the temperature of the heated oil is decreased (hereinafter "lube oil"). Next, the lube oil may flow through a heat exchanger 440; which may function to adjust the lube oil temperature to a desirable rang prior to returning to the tank 410.

A non-limiting example of the benefit of the incorporating the lube oil system 400 as the waste heat source 140 is shown in Table 2. An application of an energy balance to the data of Table 2 then follows.

TABLE 2

| Properties | Airstream | Lube Oil |
|---|---|---|
| Mass Flow | M1 = 40,171 kg/min | M2 = 3,539 kg/min |
| Temperature - Inlet | T1 = 32 Deg. F., 273 Deg. K | T2 = 160 Deg. F., 344 Deg. K |
| Temperature - Outlet | T1' = | T2' = 129 Deg. F., 327 Deg. K |
| Cp | 1.005 | 2.10 |

Energy Balance $$(M1-M2)*Cp*(T1'-T1)=M2*Cp*(T2-T2')$$

$$(40,171)*1.005*(T1'-273)=3539*2.10*(344-327)$$

$$T1'(\text{Airstream})=276 \text{ Deg. K}=37.4 \text{ Deg. F.}=3 \text{ Deg. C.}$$

Here, the 37.4 Deg. F. of T1' indicates that the airstream temperature flowing downstream of the air conditioning system 143 may be above an icing temperature.

In use, the turbine control system 190 may be integrated with the waste heat source 140 to control the heating of the airstream via the air preheating system 143. In controlling the heating of the airstream, the turbomachine control system 190 may receive data on the ambient conditions associated with the airstream. These conditions may include, but are not limited to: ambient temperature, ambient pressure, ambient humidity, or combinations thereof.

An embodiment of the present invention may perform the following steps to perform an anti-icing process on the inlet system 100 and the combustion turbine 150. Determine whether a temperature of the airstream is below a temperature range; and then determine whether to operate the air preheating system 143 to raise the temperature of the airstream above the temperature range, if required. The turbine control system 190 may also provide a bias that delays the operation of the IBH system 125 when the air preheating system 143 operates.

The turbine control system 190 may determine an efficiency of the combustion turbine 150 while control the waste heat source 140. This may occur while the turbine control system 190 receives data on: an ambient condition; an output of the waste heat source 140. The ambient condition data may include at least one of: an ambient temperature, an ambient pressure, an ambient humidity, or combinations thereof.

As discussed, an embodiment of the present invention may increase the efficiency of a combustion turbine 150. An embodiment of the present invention may delay or avoid the use of the IBH system 125.

As one of ordinary skill in the art will appreciate, the many varying features and configurations described above in relation to the several exemplary embodiments may be further selectively applied to form the other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several exemplary embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A system for heating an airstream consumed by a powerplant machine, the system comprising:
   an inlet system configured for receiving an airstream, the inlet system comprising: an air preheating system configured for heating the airstream, a weather hood, and an inlet filter house; wherein the airstream enters the air preheating system at a first temperature and exits the air preheating system at a second temperature;
   a powerplant machine configured for generating power, wherein the powerplant machine ingests the airstream at the second temperature, wherein the powerplant machine is fluidly connected to and positioned downstream of the inlet system;
   a waste heat source derived from a turbine compartment which encloses a heat generating portion, wherein the waste heat source comprises a heated air transferred directly from within the turbine compartment at a location upstream of the turbine compartment exhaust to the air preheating system;
   wherein the heated air increases the temperature of the airstream flowing through the air preheating system; and
   a turbine control system configured to determine when to use the waste heat source to increase the temperature of the airstream, wherein the turbine control system receives data on an ambient condition, and wherein the ambient condition comprises at least one of: an ambient temperature, an ambient pressure, an ambient humidity, or a combination thereof; and a waste heat exchanger configured for allowing the waste heat source to indirectly increase the temperature of the airstream, wherein the waste heat exchanger is located upstream of the air preheating system and downstream of the waste heat source.

2. The system of claim 1, wherein the powerplant machine comprises a combustion turbine that comprises a compressor section which ingests the airstream at the second temperature; wherein an upstream end of the compressor section is connected to a downstream end of the inlet system.

3. The system of claim 1, further comprising an exhaust fan configured for removing the heated air out of the turbine compartment.

4. The system of claim 3, wherein the heated air is directed to flow through to the air preheating system to increase the temperature of the airstream.

5. The system of claim 1, wherein the inlet system comprises an inlet bleed heat (IBH) system configured for increasing a temperature of the airstream.

6. The system of claim 5, wherein the air preheating system reduces use of the IBH system.

7. A system for heating an airstream consumed by a powerplant machine, the system comprising:
   an inlet system configured for receiving an airstream, the inlet system comprising: an air preheating system configured for heating the airstream, a weather hood, and an inlet filter house; wherein the airstream enters the air preheating system at a first temperature and exits the air preheating system at a second temperature;
   a combustion turbine that comprises a compressor section which ingests the airstream at the second temperature; wherein the combustion turbine is fluidly connected to and positioned downstream of the inlet system;
   a waste heat source derived from a turbine compartment which encloses a heat generating portion, wherein the waste heat source comprises a heated air transferred directly from within the turbine compartment to the air preheating system;
   a turbine control system configured to determine when to use the waste heat source to increase the temperature of the airstream, wherein the turbine control system receives data on an ambient condition, and wherein the ambient condition comprises at least one of: an ambient temperature, an ambient pressure, an ambient humidity, or a combination thereof;
   wherein the heated air increases the temperature of the airstream flowing through the air preheating system; and a waste heat exchanger configured for allowing the waste heat source to indirectly increase the temperature of the airstream, wherein the waste heat exchanger is located upstream of the air preheating system and downstream of the waste heat source.

8. The system of claim 7, wherein an exhaust fan removes a portion of heated air from within the turbine compartment and directs the heated air to flow through to the air preheating system to increase the temperature of the airstream.

* * * * *